Dec. 16, 1947.   H. G. FERGUSON   2,432,739
TRAILER ATTACHMENT AND HITCH FOR TRACTORS
Original Filed Jan. 14, 1943
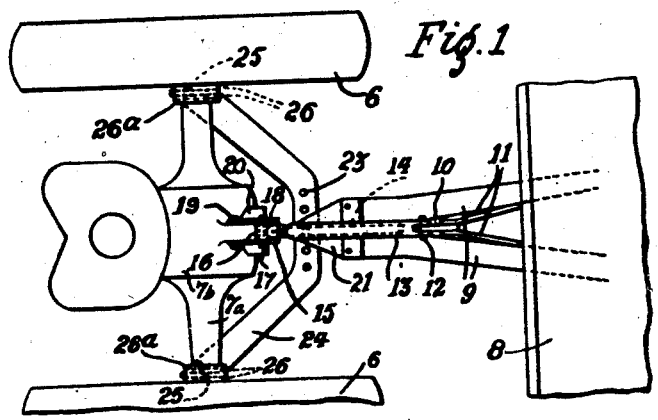
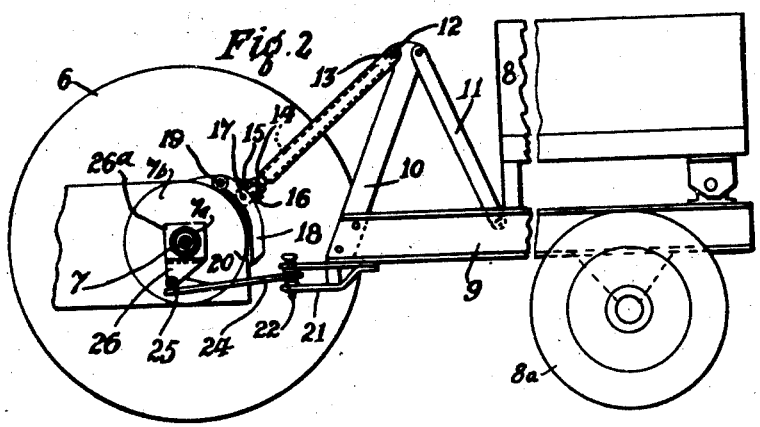
Inventor
Henry G. Ferguson Patented Dec. 16, 1947

2,432,739

UNITED STATES PATENT OFFICE 2,432,739

TRAILER ATTACHMENT AND HITCH FOR TRACTORS

Henry George Ferguson, Belfast, Northern Ireland

Original application January 14, 1943, Serial No. 472,380. Divided and this application June 11, 1945, Serial No. 598,721

In Great Britain February 27, 1942

4 Claims. (Cl. 280—33.44)

The present invention relates to hitch means for connecting unbalanced trailable devices to tractive vehicles and especially for connecting two-wheeled or equivalent non-self-balancing trailers to lightweight agricultural tractors, that is, for trailers or equivalent devices that are not only drawn by the tractive vehicle, but are also supported or steadied against tipping thereby.

An object of the present invention is to provide a novel and improved hitch arrangement for connecting a non-self-balancing trailer to a tractor in a manner to accomplish load transfer from the trailer to the rear wheels of the tractor without danger of causing the tractor to rear up on its hind wheels and while permitting a high degree of flexibility for relative movement between tractor and trailer accommodating passage over rough ground.

Another object is to provide an arrangement of the character indicated in which the trailer may be quickly and easily attached and detached and which requires only simple, rugged low-cost attachment or connecting elements.

In order that the nature and objects of the invention will be clearly understood, the following specific embodiments as applied to a lightweight Ford-Ferguson tractor will now be described by way of example with reference to the accompanying drawings, in which:

Figure 1 is a plan view of the rear end of a portion of a tractor having applied thereto a trailer attachment embodying the present invention, only the front end portion of the trailer, as such, being shown.

Fig. 2 is a side elevation of the apparatus of Fig. 1, the inner wheel of the tractor being removed to expose the hitch fully to view.

While the invention is susceptible of various modifications and alternative constructions, I have shown in the drawings and will herein describe in detail the preferred embodiment, but it is to be understood that I do not thereby intend to limit the invention to the specific form disclosed, but intend to cover all modifications and alternative constructions falling within the spirit and scope of the invention as expressed in the appended claims.

Referring more particularly to the drawings, the rear end of a portion of a tractor has been indicated more or less diagrammatically and may be, for example, a lightweight Ford-Ferguson tractor. As shown, it has rear traction wheels 6 on a rear axle 7. A rear axle casing 7a enclosing the axle and is enlarged in its central portion to form a differential housing or casing 7b.

To such tractor is attached a trailer 8. The latter has two road wheels 8a (Fig. 2) disposed toward the rear in order to throw weight forward on to the tractor. The frame beams 9 of the trailer have an upstanding member or mast 10 thereon, reinforced by stays 11, and to which is attached a tubular or socket member 13 by pivot pin 12. A spigot or rod member 14 is slidingly pin 12. A spigot or rod member 14 is slidingly telescoped within the tubular member 13 and coacts therewith to form a top link for the hitch linkage.

The forked lower end of the member 14 is connected by a pin 15 to a member 16, which is in turn pivoted by a pin 17 to a hanging, curved lever 18. The latter lever is pivoted to the differential housing 7b at 19 and has a large curved flange 20 engaging or partially embracing the differential housing. The pins 15, 17 and associated parts form a universal joint while the lever 18, 20 serves to distribute the thrust of the upper hitch link 13, 14. The resultant thrust is one passing forwardly and downwardly on to the tractor.

The beams 9 have a clevis or draft tongue 21 adapted to be connected pivotally by removable pin 22 to any selected hole 23 in a drawbar 24 which is pivotally connected for up and down movement at 25 to inverted U-brackets 26 attached to the mud guard brackets 26a at the ends of the rear axle casing 7a. The clevis and drawbar thus constitute a lower hitch connection.

The top link 13, 14 being in compression and the lower hitch connection being in tension due to the unbalanced weight or load of the trailer, the trailer load is applied, in effect, at a point between the front and rear axles of the tractor. For further detail in reference to this general mode of transferring weight from a trailer to a tractor, although through use of a specifically different hitch mechanism, see my Patent No. 2,347,898, issued May 2, 1944. The linkage here shown permits relative up and down movement between the trailer and the tractor and the trailer can swing laterally with reference to the tractor about the pin 22 and the pin 15. Thus the arrangement shown is especially suitable for heavy trailers from which a substantial load is applied to the tractor. The presently disclosed linkage also allows relative rocking movement between the tractor and trailer.

The purpose of constructing the top link of two telescoping members 13, 14, which are arranged to part company under tension, is to promote safety. Thus, should the lower linkage connection come adrift, as for example, through loss or omission of pin 22, the members 13, 14 will pull apart and there will be no danger of up-ending the tractor. Such safety arrangement, however, constitutes the subject matter of my co-pending application, Serial No. 598,722, filed June 11, 1945.

The present application is a division of my co-pending application, Serial No. 472,380, filed January 14, 1943, now Patent No. 2,393,358, Jan. 22, 1946. Said application, Serial No. 598,722, referred to above, is also a division of said co-pending application No. 472,380.

I claim as my invention:

1. In a trailer attachment for a tractor having a transverse drawbar pivoted thereto about a transverse horizontal axis lying beneath the rear axle of the tractor, the combination of a trailer having ground-engaging support means and overbalanced forwardly about the latter, an upright mast fixed rigidly in position on the forward end of said trailer, a top link, means pivoting said top link to the upper end of said mast so that said top link moves laterally with said mast, means including a universal joint on the forward end of said link for connecting the same in a downwardly inclined position to the rear end of the tractor at a point above the latter's rear axle, a coupling member rigid with the trailer and projecting forwardly therefrom, and means for pivotally connecting the forward end of said coupling member to said drawbar for lateral swing of the trailer with reference to the drawbar.

2. In a trailer attachment for a tractor having a rear axle housing and central differential housing on its rear end as well as a transverse drawbar pivoted thereto about a transverse horizontal axis lying beneath the rear axle of the tractor, the combination of a trailer having ground-engaging support means and overbalanced forwardly about the latter, an upright mast fixed rigidly in position on the forward end of said trailer, a top link, means pivoting said top link to the upper end of said mast, a lever contained to embrace the upper rear portion of said differential housing, means for pivoting the upper end of said lever to the differential housing about a horizontal pivotal axis with the lever depending from such pivot, a universal joint on the forward end of said link connecting the same in a downwardly inclined position to an intermediate portion of said lever at a point above the tractor's rear axle, a coupling member rigid with the trailer and projecting forwardly therefrom, and means for pivotally connecting the forward end of said coupling member to said drawbar for lateral swing of the trailer with reference to the drawbar.

3. In a trailer and hitch attachment for a tractor having a rear axle housing and central differential housing on its rear end, the combination of a generally U-shaped drawbar, means for pivotally attaching the ends of said drawbar to laterally spaced points on the axle housing with the pivot points located beneath and forwardly of the axle in such housing, said drawbar being shaped to clear the differential housing as it swings upwardly about its pivot, a transverse drawbar pivoted thereto about a transverse axis lying beneath the rear axle of the tractor, a trailer having ground-engaging support means and overbalanced forwardly about the latter, an upright mast fixed rigidly in position on the forward end of said trailer, a top link, means pivoting said top link to the upper end of said mast, means including a universal joint on the forward end of said link for connecting the same in a downwardly inclined position to the rear end of the tractor at a point above the latter's rear axle, a coupling member rigid with the trailer and projecting forwardly therefrom, and means for pivotally connecting the forward end of said coupling member to said drawbar for lateral swinging of the trailer about the point of pivotal connection between said coupling member and drawbar.

4. In a trailer attachment for a tractor having a transverse drawbar pivoted thereto about a transverse horizontal axis lying beneath the rear axle of the tractor, the combination of a trailer having ground engaging support means and overbalanced forwardly about the latter, an upright mast fixed rigidly in position on the forward end of said trailer, a top link connected to said mast and extending forwardly and downwardly therefrom, means including a universal joint on the forward end of said link for connecting the same to the rear end of the tractor at a point above the latter's rear axle, a draft tongue projecting forwardly from the trailer to define a pivot point, and means for pivotally connecting the pivot point on said draft tongue to said drawbar, said pivot point lying substantially in advance of the point of connection of said top link with said mast so that the top link swings laterally with respect to said tractor substantially in unison with said draft tongue.

HENRY GEORGE FERGUSON.

REFERENCES CITED

The following references are of record in the file of this patent:

UNITED STATES PATENTS

| Number | Name | Date |
|---|---|---|
| 1,815,470 | Gaiser | July 21, 1931 |